Oct. 29, 1935.    L. CAMPBELL, JR    2,019,292
COMBINED MECHANICAL AND FLUID BRAKE FOR LAND VEHICLE TRAINS
Filed May 20, 1929    3 Sheets-Sheet 1
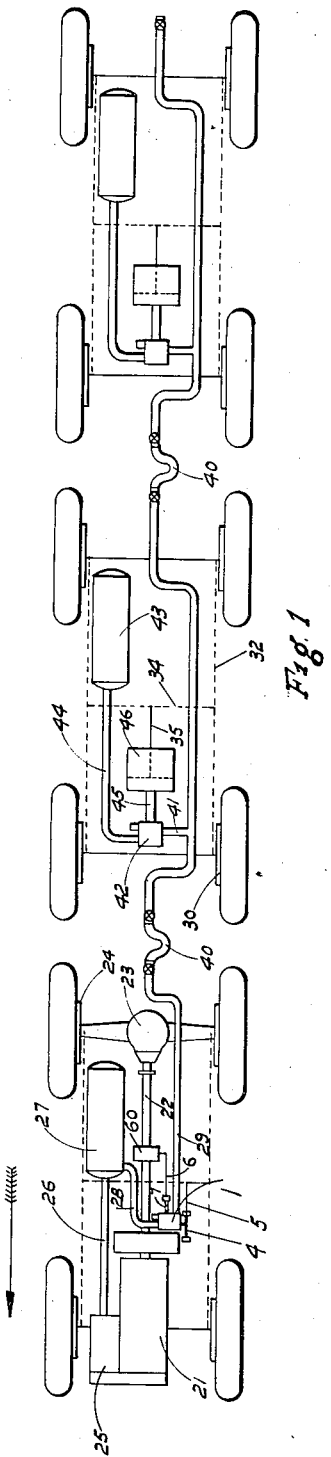
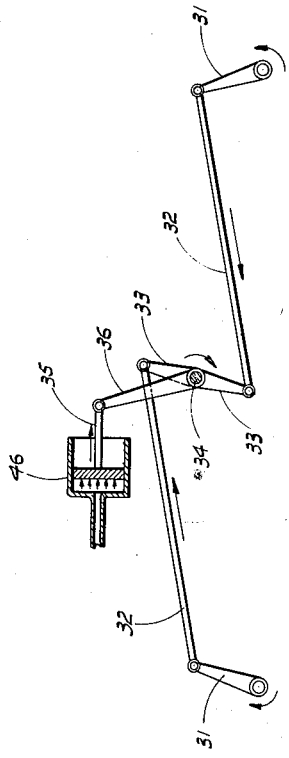
INVENTOR
LOREN CAMPBELL, JR.
BY
 Richey + Watts
HIS ATTORNEYS Oct. 29, 1935.  L. CAMPBELL, JR  2,019,292
COMBINED MECHANICAL AND FLUID BRAKE FOR LAND VEHICLE TRAINS
Filed May 20, 1929   3 Sheets-Sheet 2
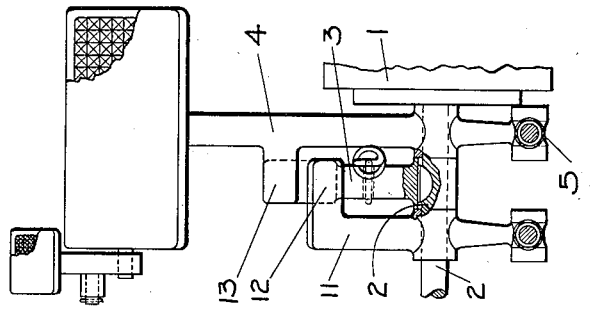
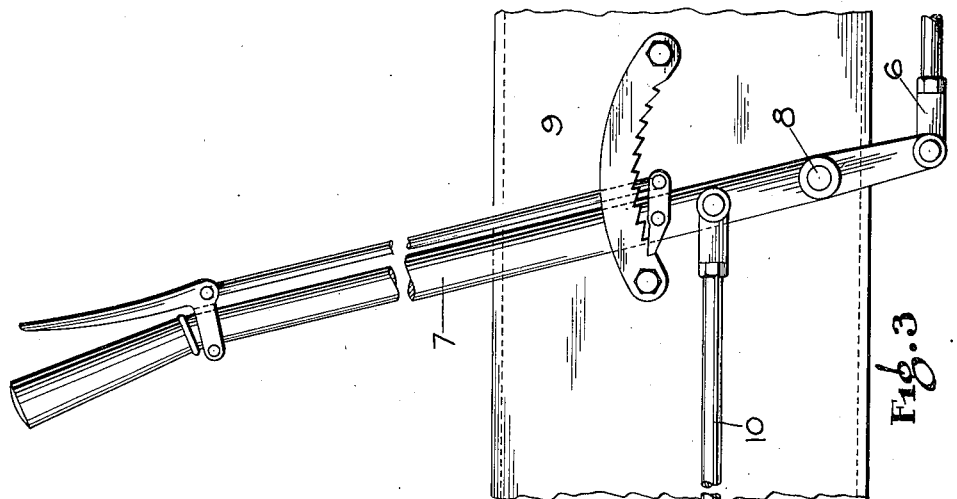
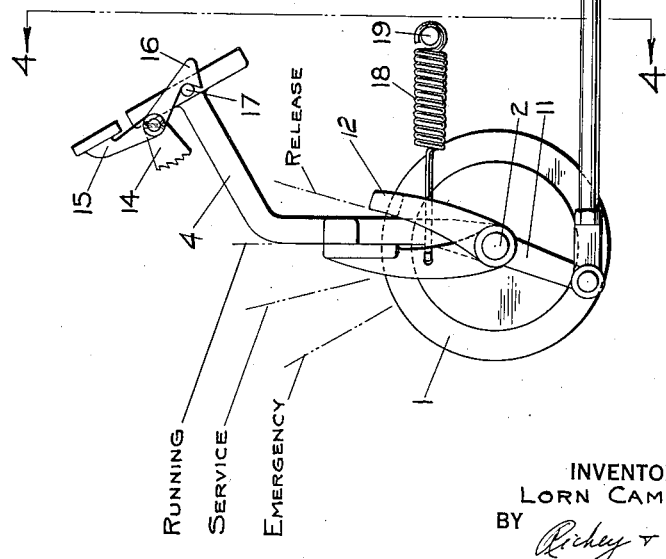
INVENTOR
LORN CAMPBELL JR.
BY
HIS ATTORNEYS

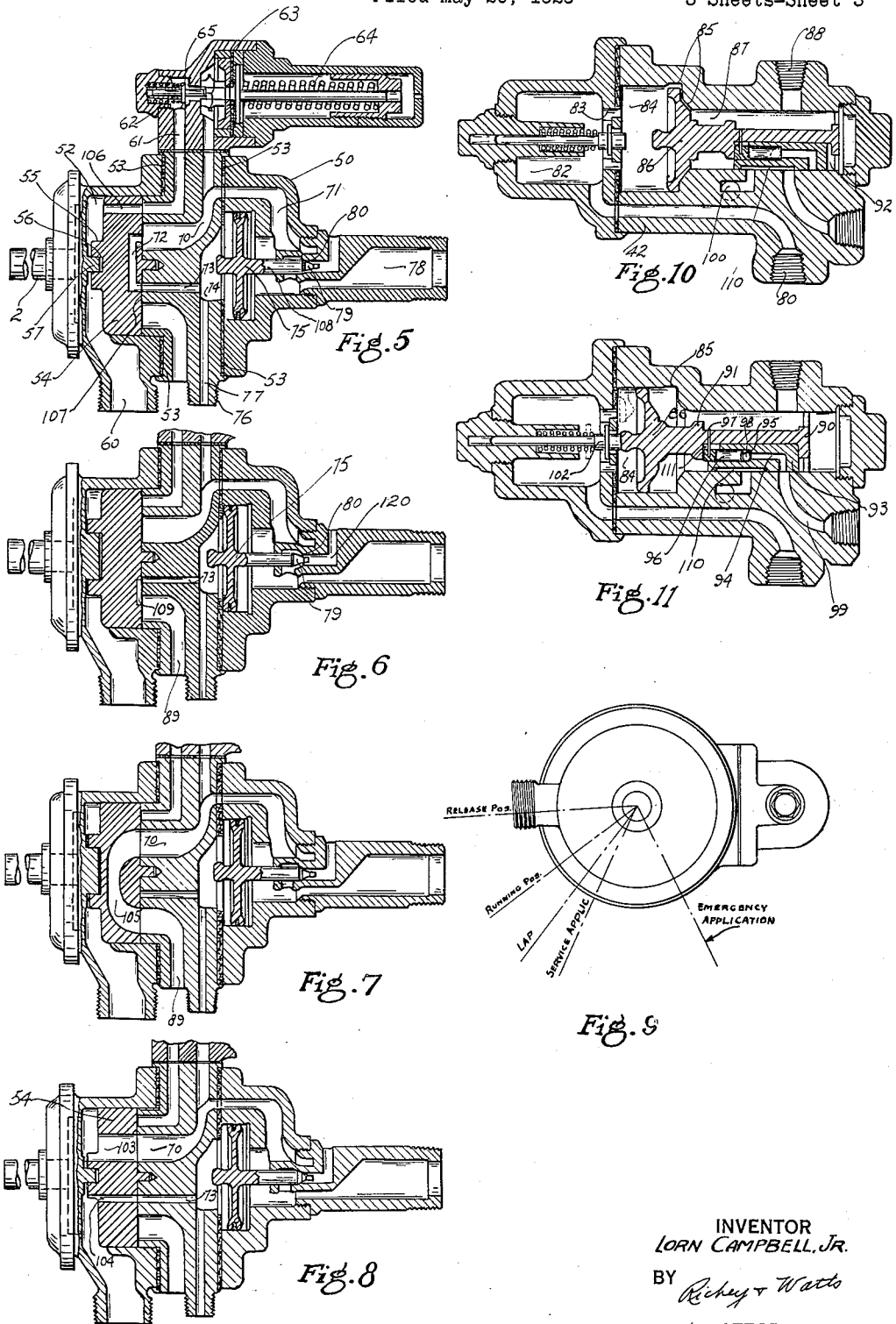

Patented Oct. 29, 1935

2,019,292

UNITED STATES PATENT OFFICE 2,019,292

COMBINED MECHANICAL AND FLUID BRAKE FOR LAND VEHICLE TRAINS

Lorn Campbell, Jr., Cleveland, Ohio

Application May 20, 1929, Serial No. 364,441

5 Claims. (Cl. 303—1)

This invention relates to means for controlling the brakes of mechanically operated and air operated brake systems and is particularly concerned with such means for use with land vehicle trains.

In controlling the braking systems of a land vehicle train where one vehicle, for example, the tractor, is equipped with one or more mechanical brake systems and the trailers are each equipped with air operated brake systems, it is quite desirable that means be provided whereby the brakes of several systems can be controlled by the tractor operator through movement of a single lever. Obviously the tractor operator must be able to control his land vehicle train while driving in traffic and safety requires that the operator must be able to control the brakes of the train with a minimum of personal attention because of the other demands on his attention, such as steering observation, traffic signals and the like.

Many busses are now constructed with mechanically operated brakes but such brakes are not readily applied to the trailers in a manner necessary for land vehicle trains which are to carry passengers or any trains which are to be operated with a maximum degree of safety to the train itself or other traffic on the highway.

Air operated brakes possess many advantages for use on trailers of such a train but are not readily combinable with the mechanically operated brakes on the tractor so that the brakes of both the tractor and the trailers can be operated by the tractor operator in a simple manner or through a single instrumentality.

By my present invention I have provided means whereby the brakes of one or more mechanically operated braking systems and the brakes of an air operated braking system can be controlled by a single lever. I have also provided means by which the brakes of one mechanically operated braking system may be controlled simultaneously with the brakes of an air operated system by a single lever, for example, a foot lever.

In the drawings accompanying this application

Fig. 1 is a diagrammatical view of the land vehicle train embodying the principles of my invention;

Fig. 2 is a diagrammatic view showing the rods and levers to operate the brake cams;

Fig. 3 is a side elevational view of a foot and hand control for actuating the brake rods;

Fig. 4 is an elevational view partly in section taken on the line 4—4 of Fig. 3;

Figs. 5 to 8, inclusive, are sectional views of a control valve, certain parts being shown in different operative positions;

Fig. 9 is an end elevation of the valve; and

Figs. 10 and 11 are sectional views of an automatic brake cylinder control valve, certain parts being shown in different operative positions.

In the drawings, I have shown diagrammatically a land vehicle train, which may comprise a certain vehicle or tractor, and a plurality of drawn vehicles or trailers. The tractor, which is indicated as having mechanical brakes, may be provided with a motor 21 which is coupled in driving relation to wheels by a differential 23, drive shaft 22, and clutching mechanism (not shown). Each of the wheels may be provided with a brake drum 24 and suitable breaking mechanism associated therewith which is operated by a rod 5 connected to a foot operated brake lever 4.

An air compressor 25, which is operated when the motor is running, supplies air under pressure to a main storage reservoir 27 through the conduit 26. A conduit 28 extends from the reservoir 27 to a control valve 1 which controls the air pressure from the tank 27 to the conduit 29.

The trailers which are shown as equipped with air operated brakes may be of the steerable type each wheel being provided with a brake drum 30. The brakes are operated by levers 31 attached to brake cams and the levers are rotated by brake rods 32 which are attached to levers 33 keyed to a shaft 34 which may extend transversely across the vehicle. The shaft may be rotated by a piston rod 35, attached to a lever 36 which is keyed on the shaft.

The main air line 29 extends throughout the length of the train being provided with flexible couplings 40 intermediate the vehicles. Branch conduits 41 are provided on each trailer which connect with a brake cylinder control valve 42. An auxiliary reservoir 43 is connected with the valve 42 by a conduit 44, and a conduit 45 maintains fluid connection between the valve and a brake cylinder 46.

A multi-way valve which controls a part of a braking system including the ordinary brake drums, brake bands, brake band actuating means, pistons and the like, conduits for conducting compressed air to the brake band actuating means, the necessary valves and air compressor all of which have been described, is connected to the brake lever assembly.

The rotatable element of the valve 1 can be moved to release air pressure from the compressor or storage tank to the conduits; also to the position in which the brakes are released which is commonly referred to as the running position; also to a position in which the brakes are applied with the force usually required in stopping a vehicle and finally to a position in which the full power of the compressed air system is applied to the brakes. This rotatable member of the valve 1 in the present instance has a shaft 2 operatively connected thereto, the shaft carrying a projection 3 keyed thereto. It will be understood that the valve 1 may be suitably supported in any desired manner on the vehicle and that shaft 2 may be supported in any suita- bearings, if desired. The shaft 2 is common to the air operated brake system and also to mechanically operated brake systems, presently to be described.

It will be noted further that the air operated brake system may be associated with the wheels of the vehicle on which the valve 1 is mounted, or if desired, the air operated brakes may be applied to the wheels of a vehicle attached to the vehicle which carries the valve 1.

A foot lever 4 loosely mounted on shaft 2 corresponds to the ordinary foot lever of an automobile and has attached thereto rod 5 which is connected with parts of a mechanically operated brake system which in addition to the lever 4 and rod 5 includes the crank and rod connections between the rod 5 and the brake bands or shoes operatively associated with the brake drums on the wheels as previously described for the trailers. The mechanically operated brake system, just described, is preferably the braking system employed on the vehicle which carries the valve 1 and includes as one element of the system the shaft 2 which is thus common to both this system of mechanically operated brakes and the above described system of air operated brakes.

When the brakes on the vehicle carrying the valve 1 are of the mechanically operated type the brakes of the air operated system will be associated with a separate vehicle attached to the vehicle carrying the valve 1.

The second system of mechanically operated brakes includes the ordinary emergency brake drum 60 mounted, for example, on the drive shaft 22 of the vehicle, the brake band therefor which through suitable rod and crank connections is connected by means of a rod 6 to a hand lever 7 pivoted on a pin 8 carried, for example, by the automobile body or frame 9. The lever 7 is connected by rod 10 to one arm of a bell crank 11 which is rotatably mounted on the shaft 2 and is provided at its free end with a lateral extension 12 to engage on one side of the projection 3. The parts of the emergency braking system, just referred to, but not shown, are sufficiently well known not to require illustration herein and in themselves do not form a part of the present invention. It will be noted that the shaft 2 constitutes a part of this emergency brake system and is, therefore, common to all three braking systems.

The foot lever 4 carries a lateral extension 13 which engages with the projection 3 of the shaft 2 on the same side of the latter as extension 12 of bell crank 11 engages. A bracket 14 attachable to any suitable fixed member, for example, the floor boards of a vehicle, carries a pivoted lever 15 having a hooked end 16 to engage with a pin 17 attached to the lever 4.

The operation of the above described mechanism is substantially as follows:

With the foot lever 4 in the position shown in Figure 3 and retained in that position by the lever 15 against the retractive force set up by a spring 18 attached to the projection 3 and to a fixed pin 19, the movable part of the valve 1 is so positioned that the brakes of the air operated piston are in released position so that the vehicle is free to run.

The foot control valve and the automatically operated brake cylinder control valve, are best shown in Figures 5 to 11 inclusive. The foot operated control valve comprises generally, a housing 50 which may be constructed in a plurality of parts secured together by bolts (not shown) suitable gaskets 53 being interposed between the portions to seal the same.

A rotatable valve element 54 is disposed in a recess 52 in the left hand portion of the housing, as viewed in the figures, and is provided with a stem 55 having therein a transverse slot 56 adapted to cooperate with a lug 57 disposed on the end of the shaft 2 to operate the valve upon rotation of the shaft. A pivotal extension is provided on the valve opposite the stem 55 to support the valve, being seated in a recess in the housing. The projecting lug 3 of the foot lever assembly is keyed to the shaft 2, while the other levers are rotatably journalled thereon. The conduit 28 connects the main reservoir 27 to the inlet opening 69 of the valve and is in fluid communication with an annular space to one side of the rotatable valve element, which element is provided with a plurality of canals therethrough as shown by the various figures of the drawings.

Figure 5 of the drawings, shows the valve in what is termed, a "running position" wherein compressed air from the reservoir 27 is passed to the main line 29, such air entering the inlet 60 passes through a canal 106 in the rotatable element 54 into a canal 61 to the right thereof. The various canals in the rotatable element are adapted to register at predetermined positions with other canals in the body of the valve passage to selectively couple the various passages.

The compressed air is conducted through the passage 61 to a pressure regulating valve assembly 62 adaped to maintain the pressure in the line 29 at a certain predetermined amount by means of the diaphragm 63 and the adjustable spring 64. When pressure upon the diaphragm becomes great enough to overcome the resiliency of the spring, a valve 65 is closed, preventing the air from passing through the orifice. The compressed air is then conducted into the branch canals 70 and 71. The canal 70 leads to the valve seat 107 and is connected by a U-shaped opening 72 in the rotatable valve element with a canal 73 leading to a chamber 74 to the left of a piston 75. The capacity of the chamber 74 may be increased by attaching a small reservoir thereto, which is not shown, by means of a threaded boss 76 which is connected with the canal 77.

The other branch 71 of the canal passes around the stem of the piston 109, as shown, through the opening 78 into the train line. It may be seen that with the rotatable valve element in this position wherein the pressure is the same on both sides the piston 75 is retained in a position with the stem thereof, which comprises a poppet valve 79, closing a valve port 80, later more fully described.

The air which moves through the control valve 70 as described passes through the train line 29 and couplings 49 to the automatic cylinder control valve 42. As best illustrated in Fig. 10 the air enters an inlet 80 of the valve 42 which leads to a chamber 82 through ports 83 to a relatively large cylindrical piston chamber 84. The air seeps through feed groove 85 around the edge of a piston 86 which is at the right of the cylinder, into a small bore 87 disposed in the rear of the piston, and through an opening 88 to the auxiliary reservoir, bringing the charge in the reservoir up to an equal pressure with that of the main line.

The rotatable valve element may be rotated from a running position to the service application and to the emergency application of the brakes, the degree of rotation being indicated best in Figs. 3 and 9.

When it is desired to apply the brakes the foot pedal is depressed which rotates the shaft through an arc from the running position to the service position rotating with it the valve element, to the position shown in Fig. 6. In this position a recess 109 interconnects the passage or canal 73 with a passage 89 which discharges the compressed air to the atmosphere. This causes a reduction in pressure to the left of the piston 75 causing the piston to be projected longitudinally to the left by the pressure of the air on the opposite side, which opens the valve port 80, ordinarily closed by the poppet valve 79, allowing the air from the train line 29 to exhaust through the passage 120 to the atmosphere. Reduction of pressure in the train line causes a reduction of pressure in the cylinder 84 to the left of the piston 86 in the automatic valve, which causes the piston of the valve to be thrust to the left as shown in the Figure 11 closing the passage 85.

The stem of the piston, which is enclosed in cylinder 87 is provided with a flange 90 at its end and a flange 91 intermediate its ends, and is provided with a recess 92 on the one side, or bottom as viewed in the figures, in which is enclosed a slide valve 93. The slide valve is provided with a conduit 94 therein, which is provided with a shoulder at 95 to form a seat for poppet valve 96.

The poppet valve is connected directly to the stem of the piston by a pin 97 which extends through a slot 111 in the body of the valve to allow the poppet valve to be reciprocated by the piston relative to the body. Reciprocation of the piston causes the poppet valve 96 to be moved from its seat 95 by the pin 97, uncovering a restricted port or passage 98, which connects with the cylinder 87 to allow the compressed air to pass therethrough to the conduit 94 in the slide valve.

Further longitudinal movement of the piston until it strikes the spring pressed stop 102 causes the flange 90 on the piston stem to engage the end of the valve and slide it along the cylinder until the conduit 94 aligns with a passage 99 which connects with the conduit 45 connecting the reservoir with the cylinder admitting air to the cylinder 46. It will thus be seen that reduction in pressure in the air line causes the automatic valve to admit air to the piston cylinder 46 actuating the piston to apply the brakes.

The control valve may be rotated to such a position that communication between all of the passages is cut off. This position, as best shown in Fig. 9, is called the lap position and when the brakes have been applied slightly the pedal may be released slightly and retained in the lap position wherein the brakes are maintained in a partially actuated condition. In order to release the brakes the brake pedal must be retracted, by operating the lever 15, to full released position. In this position, which is best shown in Figure 8, the main line is connected directly through the passages 70 and 73 by means of passages 103 and 104 in the member 54 wherein the pressure in the main line is brought up to its normal pressure which causes the automatic valve and the piston thereof to be rotated to the position at the right, as best shown in Fig. 10, where the pressure from the brake cylinder may escape through a recess 110 in the bottom of the slide valve through the port 100 to the atmosphere releasing the brake.

A so-called emergency position is provided as best shown in Fig. 7, in which position, a relatively large U-shaped opening 105 in the rotatable member connects the passage 70 directly to the atmosphere, exhausting the air very quickly from the train line. When the air is exhausted quickly from the train line the increase in pressure on the piston in the automatic valve causes the piston to be pressed longitudinally to the left where the end of the piston impinges upon the spring-pressed stop with such force as to compress the spring as indicated by the dotted lines, and allowing the slide valve and stem to be pushed sufficiently past the passage 99 which connects to the brake cylinder so that direct communication is had between the auxiliary reservoir and the brake cylinder applying the brakes to their utmost.

When the vehicle is to be stopped the foot lever 4 is pushed toward the left as viewed in Figure 3 thereby turning shaft 2 and the movable valve part, whereupon the compressed air in the system operates to actuate the air operated brakes. Simultaneously, therefore, the brake rod 5 is actuated to apply the brakes of the mechanically operated system. These brakes bring the vehicle, or vehicles, to a stop. As the vehicle stops and the foot lever 4 returns to the running position the hook 16 of lever 15 engages the pin 17 and stops further movement of the lever 4. While this movement of lever 4 releases the brakes of the mechanically operated system it does not release the brakes of the air operated system and before the vehicle can again be started the lever 15 must be rocked about its pivot point to release the hook 16 from pin 17 whereupon spring 18 pulls the projection 3 and lever 4 to the right as viewed in Figure 3, until the movable part in the valve 1 has reached the released position when the brakes of the air operated system will be loosened and released. Then the lever 4 is moved forward until the lever 15 engages with the pin 17 thus returning the projection 3 and the movable part of the valve to the running position.

In the event that the emergency brake is to be operated the hand lever 7 will be moved to the right as viewed in Figure 3 applying the emergency brake through the medium of rod 6 and simultaneously therewith, rotating bell crank 11 about shaft 2 bringing extension 12 into contact with projection 3 and moving it and the movable part of the valve 1 to emergency position which sets the brakes of the air operated system. The foot lever 4 may be simultaneously moved if desired to actuate the brakes of the other mechanically operated system. When the emergency brake is released by means of a lever 7 the spring 18 retracts the projection 3 and the movable part of the valve to the running position where lever 15 stops further return movement and leaves the brakes of the air system still set. To start the vehicle, or vehicles, it is necessary to release the lever 15, permit the lever 4 and projection 13 to move to the released position and then return the lever 4 to the running position as above described.

It will be clear from the foregoing description that my invention may be applied to brakes mounted on the same vehicle or on vehicles in which the mechanically operated brakes control one vehicle and the air operated brakes control one or more vehicles attached to the mechanically braked vehicle.

Having thus described my invention so that those skilled in the art may understand the same, what I desire to secure by Letters Patent is described in what is claimed.

1. A land vehicle train including a tractor having a system of mechanically operated brakes, a trailer swingably coupled thereto and having a system of air operated brakes including a compressed air tank on the tractor, a compressed air tank on the trailer and means operatively joining the tanks, including a valve on the tractor, a conduit and a valve on the trailer, and a lever for actuating the valve and brakes on the tractor to simultaneously engage the brakes on the trailer and tractor, and a second lever for operating the mechanical brakes and actuating the air valve independently of the first lever.

2. In a brake system for land vehicle trains comprising a tractor having a system of fluid pressure and a reservoir, a trailer having a storage reservoir, fluid brakes on the trailer, a train line connecting the vehicles, a control means carried by the tractor comprising a foot lever and an air valve lever adapted to actuate an air valve, mechanical brakes on the tractor operable by said foot lever, a hand operated lever for engagement with the air valve lever to allow the mechanical brakes to be released and retain the air valve in position when the fluid brakes are in a braking position.

3. In a brake control for a land vehicle train having fluid brakes on the trailers and mechanical brakes on the tractor comprising an air valve controlled by a rotatable shaft, a foot lever rotatably mounted on said shaft, a second lever secured to the shaft and adapted to be engaged by the foot lever, a third lever rotatably mounted upon the shaft and adapted to engage the second named lever and a hand lever adapted to be connected to said third lever, said hand lever being operable to actuate the air valve and the mechanical brakes and operable to release the mechanical brakes means to maintain the air valve in a braking position and to release the air valve and release the brakes.

4. In a braking system for land vehicle trains comprising a tractor having a system of fluid pressure and reservoir, a trailer having a storage reservoir and fluid operated brakes, a control means carried by the tractor comprising a foot lever adapted to actuate an air valve, service brakes on the tractor operable by said foot lever, a hand lever, emergency brakes operable thereby, said foot lever controlling said service brakes and said fluid operated brakes, and said hand lever controlling said fluid operated brakes independently of said service brakes when said service brakes are released.

5. A land vehicle train including a tractor having a system of mechanically operated brakes, a trailer swingably coupled thereto and having a system of air operated brakes including a compressed air tank on the tractor, a compressed air tank on the trailer and means operatively joining the tanks, including a valve on the tractor, a conduit and a valve on the trailer, and a lever for actuating the valve and brakes on the tractor to simultaneously engage the brakes on the trailer and tractor, and a second lever for operating the mechanical brakes and actuating the air valve on the tractor independently of the first lever, and a latch adapted to engage the first lever for maintaining the same in actuated position.

LORN CAMPBELL, Jr.